(12) United States Patent
Kirchmeyer et al.

(10) Patent No.: US 6,417,312 B1
(45) Date of Patent: *Jul. 9, 2002

(54) THERMOPLASTIC POLYURETHANE ELASTOMERS

(75) Inventors: Stephan Kirchmeyer, Leverkusen; Hanns-Peter Müller, Odenthal; Martin Ullrich, Leverkusen; Ulrich Liesenfelder, Bergisch Gladbach, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 08/655,783

(22) Filed: May 31, 1996

(30) Foreign Application Priority Data

Jun. 7, 1996 (DE) .......................... 195 20 732

(51) Int. Cl.$^7$ .................. C08G 18/10; C08G 18/08; C08G 18/30; C08G 18/40
(52) U.S. Cl. .................. 528/59; 264/165; 528/44; 528/60; 528/61; 528/65; 528/76; 528/80; 528/85
(58) Field of Search .................. 528/44, 59, 76, 528/80, 85, 60, 61, 65; 264/165

(56) References Cited

U.S. PATENT DOCUMENTS

| | | | |
|---|---|---|---|
| 3,642,964 A | 2/1972 | Rausch, Jr. et al. | 264/40 |
| 3,963,679 A | 6/1976 | Ullrich et al. | 528/45 |
| 4,597,927 A | 7/1986 | Zeitler et al. | 264/85 |
| 5,069,881 A | * 12/1991 | Clarkin | 422/135 |
| 5,360,885 A | 11/1994 | Orthmann et al. | 528/49 |
| 5,739,252 A | * 4/1998 | Kirchmeyer et al. | 528/59 |

FOREIGN PATENT DOCUMENTS

| | | |
|---|---|---|
| CA | 2088521 | 8/1993 |
| DE | 2823762 | * 12/1978 |
| DE | 3230009 | 3/1983 |
| EP | 519734 | 12/1992 |
| EP | 571828 | 12/1993 |
| EP | 571831 | 12/1993 |
| GB | 1057018 | 2/1967 |
| GB | 1547480 | 6/1979 |
| WO | 81/00259 | 2/1981 |

OTHER PUBLICATIONS

Methoden der organischen Chemie (Houben–Weyl) vol. E 20, G. Thieme Verlag, Stuttgart, New York, 1987 pp. 1613–1617.

* cited by examiner

Primary Examiner—Rabon Sergent
(74) Attorney, Agent, or Firm—Joseph C. Gil; Aron Preis

(57) ABSTRACT

A process for the production of thermoplastic polyurethane elastomer is disclosed. The process entails (a) introducing and homogeneously mixing in a first static mixer (A) an isocyanate and (B) a mixture of compounds having an average of 1.8 to 3.0 Zerewitinoff active hydrogen atoms having a molecular weight of 400 to 10000 with and chain extenders having an average of 1.8 to 3.0 Zerewitinoff active hydrogen atoms and a molecular weight of 62 to 400 and optional auxiliaries to form a substantially unreacted mixture and (b) reacting said substantially unreacted mixture in a second static mixer to form thermoplastic polyurethane elastomer. The elastomer thus produced has improved mechanical properties and is suitable for the production of moldings.

3 Claims, No Drawings

THERMOPLASTIC POLYURETHANE ELASTOMERS

The present invention relates to thermoplastic polyurethane elastomers, to a process for the production thereof and to the use thereof.

Thermoplastic polyurethanes (TPU) are of significance because they have good elastomeric properties and may readily be melt processed. A very wide range of mechanical properties may be obtained by appropriate selection of the components. A review of TPU, their properties and applications may be found, for example, in *Kunststoffe* 68 (1978), pp. 819–825, *Kautschuk, Gummi, Kunststoffe* 35 (1982), pp. 569–584 and G. Becker, D. Braun *Kunststoff-Handbuch*, volume 7, *Polyurethane*, Munich, Vienna, Carl Hanser Verlag 1983. A review of production processes may be found in *Plastverarbeiter* 40 (1989).

TPU are mainly synthesized from linear polyols, such as polyester or polyether polyols, organic diisocyanates and short-chain, mainly difunctional alcohols (chain extenders). They may be produced continuously or discontinuously. The best known production processes are the belt process and the extruder process.

In the belt process, the starting materials are metered into a mixing head and vigorously mixed together in a very short period of time while they are still at a low viscosity. The reaction composition is then discharged onto a circulating steel or plastic belt on which the mixture reacts and solidifies with the addition of heat (GB-PS 1,057,018; DE-OS 3,224,324).

In the extruder process, the starting materials are together metered into a screw reactor, where they undergo polyaddition and are then converted into uniform pellets (U.S. Pat. No. 3,642,964; DE-PS 2,302,564; DE-PS 2,549,371; DE-OS 3,230,009; EP-OS 0,031,142).

The advantage of the belt process resides in the short mixing time for the starting materials and the subsequent shear-free and thus undisrupted reaction. The resultant polyurethanes exhibit very good phase segregation and are particularly suitable for films. The disadvantage of the belt process resides in the costly working up processes for the primary polymer sheets or strands obtained using this process. These do not have a uniform polymer structure and must subsequently be comminuted into homogeneous pellets and re-extruded.

In contrast, the extruder process is simple and low in cost, but the starting materials are not mixed until they reach the extruder under conditions in which polyaddition occurs. As a consequence, there are elevated concentrations of one component in certain areas of the extruder and unwanted and uncontrollable secondary reactions occur. Moreover, the polyurethanes are exposed to elevated shear forces throughout the period of production. As a result, the phase segregation which occurs during polyaddition is severely disrupted and the resultant polyurethanes are only poorly suited to certain purposes, for example film production.

It is proposed in EP-A 0,554,718 and EP-A 0,554,719 to improve the extruder process by bringing the starting materials together in a nozzle and mixing them before they enter the extruder. Here too, the majority of the polyaddition reaction proceeds in the extruder, such that the TPU are exposed to severe shear forces during production and are thus damaged.

There is thus still considerable interest in TPU with improved properties and in processes which avoid the stated disadvantages in such a manner that polyurethanes may be produced in a controlled manner and with purposefully selected properties.

It has now been found that TPU having improved properties may be obtained in a process where the isocyanate is first mixed with the isocyanate-reactive component in a first static mixer to form a substantially unreacted reaction mixture and complete the reaction later in a second static mixer.

By means of this process, homogeneous TPU with greatly improved properties compared with those of known processes are obtained. This was not expected.

The present invention provides a process for the production of thermoplastic polyurethane elastomers which comprises (a) introducing and homogeneously mixing (A), (B) and optional (C) in a first static mixer at a shear rate of 500 to 50000 $s^{-1}$ and at a temperature of 50 to 250° C., to form a substantially unreacted mixture and (b) reacting said substantially unreacted mixture in a second static mixer operating at a shear rate of 1 to 100 $s^{-1}$ and a temperature of 50 to 250° C., to form a thermoplastic polyurethane elastomer, wherein (A) denotes one or more isocyanates, and where (B) denotes a mixture of (B1) and (B2) where B1 is 0 to 85 equivalent-% (relative to the isocyanate groups in (A)) of one or more compounds having an average of 1.8 to 3.0 Zerewitinoff active hydrogen atoms and a number average molecular weight of 400 to 10000, and where B2 is 15 to 100 equivalent-% (relative to the isocyanate groups in (A)) of one or more chain extenders having an average of 1.8 to 3.0 Zerewitinoff active hydrogen atoms and a molecular weight of 62 to 400, and where (C) is a positive amount up to 20% (relative to the weight of said thermoplastic polyurethane elastomer) of auxiliary additives.

The present invention furthermore provides the thermoplastic polyurethane elastomers obtained in this manner.

The present invention also provides the use of the thermoplastic polyurethane elastomers for the production of moldings (for example by casting, compression molding, injection molding), such as sheets, containers, equipment components, casings, rollers, gears, machinery and vehicle components, rolls, elastic coatings, blown and flat films, sheathing, tubes, catheters, seals, profiles, bearing bushes, threads, filaments and fibers.

Isocyanates (A) which may be used are aliphatic, cycloaliphatic, araliphatic, aromatic and heterocyclic polyisocyanates or any mixture of these polyisocyanates (c.f. Houben-Weyl, *Methoden der Organischen Chemie*, volume E 20, *Makromolekulare Stoffe*, Georg Thieme Verlag, Stuttgart, New York 1978, pages 1587–1593). Examples are ethylene diisocyanate, 1,4-tetramethylene diisocyanate, 1,6-hexamethylene diisocyanate, 1,12-dodecane diisocyanate, 1,3-cyclobutane diisocyanate, 1,3- and 1,4-cyclohexane diisocyanate together with any desired mixtures of these isomers, 1-isocyanato-3,3,5-trimethyl-5-isocyanatomethyl cyclohexane, 2,4- and 2,6-hexahydrotolylene diisocyanate together with any desired mixtures of these isomers, hexahydro-1,3- and/or -1,4-phenylene diisocyanate, perhydro-2,4'- and/or -4,4'-diphenylmethane diisocyanate, norbornene diisocyanates (for example U.S. Pat. No. 3,492,330), 1,3- and 1,4-phenylene diisocyanate, 2,4- and 2,6-tolylene diisocyanate together with any mixture of these isomers, 2,4'- and/or -4,4'-diphenyl methane diisocyanate.

Aromatic diisocyanates are preferred, in particular optionally alkyl-substituted tolylene and diphenylmethane diisocyanates, aliphatic diisocyanates, in particular hexamethylene diisocyanate and cycloaliphatic diisocyanates such as 1-isocyanato-3,3,5-trimethyl-5-isocyanato methylcyclohexane, perhydro-2,4'- and/or -4,4'-diphenylmethane diisocyanates.

Isocyanates having a functionality greater than 2.0 to 3.0 may optionally also be used, such as 4,4',4"-triphenylmethane triisocyanate, polyphenyl/polymethylene polyisocyanates (for example obtained by aniline/formaldehyde condensation and subsequent phosgenation), together with the distillation residues which contain isocyanate groups which result during industrial isocyanate production, optionally in one or more of the above-stated polyisocyanates. However, care must be taken in this case to ensure that an average functionality of two is not exceeded if the polyurethanes are to be melt processed. It may be necessary to compensate for reactants with high functionality by using additional reactants with a functionality lower than two.

Monofunctional isocyanates suitable for this purpose are, for example, stearyl isocyanate, cyclohexyl isocyanate and phenyl isocyanate.

Zerewitinoff active compounds B1 are compounds having an average of 1.8 to 3.0 Zerewitinoff active hydrogen atoms and a number average molecular weight of 400 to 10000.

Such compounds include, as well as compounds containing amino groups, thiol groups or carboxyl groups, in particular compounds containing two to three, preferably two hydroxyl groups, especially those of a molecular weight of 450 to 6000, particularly preferably those of a molecular weight of 600 to 4500, for example polyesters, polyethers, polycarbonates and polyesteramides containing hydroxyl groups.

Suitable polyesters are, for example, reaction products of polyhydric, preferably dihydric and optionally also trihydric alcohols with polybasic, preferably dibasic carboxylic acids or the esterifiable derivatives thereof. The polycarboxylic acids may be aliphatic, cycloaliphatic, aromatic and/or heterocyclic, including halogen-substituted and/or unsaturated acids.

Examples of such carboxylic acids and the derivatives thereof which may be cited are: succinic acid, adipic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, maleic acid, maleic anhydride, fumaric acid, dimerised and trimerised unsaturated fatty acids, optionally mixed with monomeric unsaturated fatty acids, terephthalic acid dimethyl ester and terephthalic acid bisglycol ester.

Polyhydric alcohols include ethylene glycol, 1,2- and 1,3-propylene glycol, 1,4- and 2,3-butylene glycol, 1,6-hexanediol, 1,8-octanediol, neopentyl glycol, 1,4-bis-(hydroxymethyl)cyclohexane, trimethylolpropane, trimethylolethane, together with di-, tri-, tetra- and higher polyethylene glycols, di- and higher polypropylene glycols, together with di- and higher polybutylene glycols. The polyesters may contain a proportion of terminal carboxyl groups. Polyesters prepared from lactones, for example ε-capro lactone, or from hydroxycarboxylic acids, for example ω-hydroxy-caproic acid, may also be used. It is, however, also possible to use hydroxy-functional polyesters known from fats chemistry, such as for example castor oil, and the transesterification products thereof.

Suitable polyethers are known per se and may be produced, for example, by the polymerization of epoxides, such as ethylene oxide, propylene oxide, butylene oxide, styrene oxide or epichlorohydrin or of tetrahydrofuran with itself, for example in the presence of Lewis catalysts such as boron trifluoride, or by the addition of epoxides, preferably of ethylene oxide and propylene oxide, optionally mixed or in succession, onto starter components with reactive hydrogen atoms such as water, alcohols, ammonia or amines, for example ethylene glycol, 1,3- or 1,2-propylene glycol, water, 4,4'-dihydroxdiphenyl-propane, aniline, ethanolamine or ethylenediamine.

Polycarbonates containing hydroxyl groups which may be considered are per se known polycarbonates which may be produced, for example, by the reaction of diols such as 1,3-propanediol, 1,4-butanediol and/or 1,6-hexanediol, diethylene glycol, triethylene glycol, tetraethylene glycol or thiodiglycol with diaryl carbonates, for example diphenyl carbonate, or phosgene (DE-OS 1,694,080, 2,221,751).

Suitable polyesteramides and polyamides include the predominantly linear condensation products obtained from polybasic saturated or unsaturated carboxylic acids or the anhydrides thereof and polyfunctional, saturated or unsaturated amino alcohols, diamines, polyamines and the mixtures thereof.

Polyhydroxy compounds containing high molecular weight polyaddition or polycondensation products or polymers in a finely dispersed, dissolved or graft-polymerized form are also suitable. Such modified polyhydroxy compounds may be obtained, for example, if polyaddition (for example reaction of polyisocyanates with amino-functional compounds) or polycondensation (for example of formaldehyde with phenols and/or amines) is allowed to proceed in the presence of the compounds containing hydroxyl groups. Such processes are described, for example, in DE-AS 1,168,075 and 1,126,142, as well as DE-OS 2,324,134, 2,423,984, 2,512,385, 2,513,815, 2,220,796, 2,550,797, 2,550,833, 2,550,862, 2,633,293 and 2,639,254. It is, however, also possible according to U.S. Pat. No. 3,869,413 or DE-OS 2 550 860 to mix an already-produced aqueous polymer dispersion with a polyhydroxy compound and then to remove water from the mixture.

Polyhydroxyl compounds modified by vinyl polymerization are also suitable, as are, for example, the ones obtained by the polymerization of styrene and acrylonitrile in the presence of polyethers (U.S. Pat. Nos. 3,383,351, 3,323,093, 3,110,695, DE-AS 1,152,536) or polycarbonate polyols (DE-PS 1,769,795, U.S. Pat. No. 3,637,909). Polybutadienes containing hydroxyl groups are also suitable.

Naturally, mixtures of the above-stated compounds may also be used, for example mixtures of polyethers and polyesters.

Zerewitinoff active compounds (B2)—chain extenders—have on average 1.8 to 3.0 Zerewitinoff active hydrogen atoms and a molecular weight of 62 to 400. These compounds are taken to include, as well as compounds containing amino groups, thiol groups or carboxyl groups, those with two to three, preferably two hydroxyl groups.

Examples of compounds (B2) are di- and polyols such as ethylene glycol, 1,2- and 1,3-propylene glycol, 1,4- and 2,3-butylene glycol, 1,5-pentanediol, 1,6-hexanediol, 1,8-octanediol, neopentyl glycol, 1,4-bis(hydroxymethyl) cyclohexane, 2-methyl-1,3-propanediol, glycerol, trimethylolpropane, 1,2,6-hexanetriol, trimethylolethane and pentaerythritol, di-, tri-, tetra- and higher polyethylene glycols with a molecular weight of up to 400, together with di- and higher polypropylene glycols with a molecular weight of up to 400, 4,4'-dihydroxydiphenol-propane, di(hydroxymethyl)hydroquinone, ethanol-amine, diethanolamine, N-methyldiethanolamine, triethanolamine and 3-aminopropanol; aliphatic diamines such as, for example, ethylenediamine, 1,4-tetramethylene-diamine, hexamethylenediamine, together with the mixtures thereof, 1-amino-3,3,5-trimethyl-5-aminomethyl-cyclohexane ("isophoronediamine"), 2,4- and 2,6-hexahydrotoluylene-diamine together with the mixtures thereof, perhydro-2,4'- and -4,4'-diaminodiphenyl-methane, p-xylylene-diamine and bis-(3-aminopropyl)methylamine; aromatic diamines which may be cited are bisanthranilic acid esters, 3,5- and 2,4-diaminobenzoic acid esters, 3,3'-dichloro-4,4'-diaminodiphenylmethane, tolylenediamine and 4,4'-diaminodiphenylmethane.

Compounds which are monofunctional towards isocyanates may also be used in proportions of up to 2 wt. %, relative to the TPU, as chain terminators. Suitable compounds are, for example, monoamines such as butyl- and dibutylamine, octylamine, stearylamine, N-methylstearylamine, pyrrolidine, piperidine and cyclohexylamine, monoalcohols such as butanol, 2-ethylhexanol, octanol, dodecanol, the various amyl alcohols, cyclohexanol and ethylene glycol monomethyl ether.

The isocyanate-reactive compounds must be selected in such a manner that their average functionality does not exceed 2.0, if melt processable polyurethane elastomers are to be produced. If more highly functional compounds are used, overall functionality must be reduced to approximately 2 by the addition of monofunctional compounds.

The relative quantities of compounds (B1) and (B2) in (B) are preferably selected such that the ratio of the total of isocyanate groups in (A) to the total of Zerewitinoff active hydrogen atoms in (B) is 0.9:1 to 1.2:1.

The thermoplastic polyurethane elastomers according to the invention may contain as (C) preferably at most up to 20 wt. % (relative to the total quantity of TPU) of further auxiliary substances and additives.

These include known catalysts, for example tertiary amines, such as triethylamine, N-methylmorpholine, N-ethylmorpholine, N,N,N',N'-tetra methyleneethylenediamine, pentamethyldiethylenetriamine, 1,4-diazabicyclo[2.2.2]octane, N-methyl-N'-dimethylaminoethylpiperazine (DE-OS 2 636 787), N,N-dimethylbenzylamine, N,N-dimethylcyclohexylamine, 2-methy-limidazole, monocyclic and bicyclic amidines (DE-OS 1,720,633), bis-(dialkylamino)alkyl ethers (U.S. Pat. No. 3,330,782, DE-AS 1,030,558, DE-OS 1,804,361, 2,618,280), as well as tertiary amines which contain amide groups (preferably formamide groups) according to DE-OS 2,523,633 and 2,732,292. Other organic metal compounds, in particular organic tin compounds, may also be used as catalysts. Organic tin compounds which may be considered, apart from compounds containing sulphur such as di-n-octyltin mercaptide (DE-AS 1,769,367, U.S. Pat. No. 3,645, 927), are preferably tin(II) salts of carboxylic acids such as tin(II) acetate, tin(II) octoate and tin(II) laurate as well as tin(IV) compounds, such as for example dibutyltin oxide, dibutyltin dilaurate or dioctyltin diacetate. Further compounds include titanium, bismuth and antimony compounds, such as for example antimony triisopropoxide, antimony octoate, antimony tallate, bismuth salts of carboxylic acids with 2 to 20 carbon atoms, such as bismuth trioctanoate, dibutylbismuth octanoate, triphenylbismuth didecanoate and dibutyltitanium bis(acetylacetonate).

Further suitable catalysts are described in *Kunststoff Handbuch* volume VII, *Polyurethane*, edited by Vieweg and Höchtlen, Carl Hanser Verlag, Munich 1966, for example on pages 96 to 102.

The total quantity of catalysts in the TPU according to the invention is about 0 to 5 wt. %, preferably 0 to 2 wt. %, relative to the total quantity of TPU.

Further additives and auxiliary substances include: pigments, dyes, flame retardants such as tris(chloroethyl) phosphate, tricresyl phosphate or ammonium phosphate and pyrophosphate, stabilizers to counter the action of ageing and weathering, plasticizers, lubricants and mould release agents, substances with a fungistatic and bacteriostatic action, as well as fillers such as calcium carbonate, silica gel, barium sulphate, calcium sulphate, kaolin, bentonite, zeolites, ground glass, glass beads, fibers of glass, plastic or carbon, silica sand or silica flour, silicon carbide, aluminum trihydrate, chalk, dolomite or mixtures thereof.

In the first stage of the process, the starting compounds (A), (B) and (C) are mixed in a static mixer to form a substantially unreacted mixture. It is, however, permissible for up to 10 wt. %, preferably up to 5 wt. %, of the isocyanate groups present in the reactive mixture to react.

The isocyanates (A) may be used as monomeric di- or polyisocyanates or, alternatively, preferably as prepolymers. Prepolymers may be produced by reacting the entire quantity or a proportion of (A) with the entire quantity or a proportion of (B1), optionally in the presence of the auxiliary substances (C), at 30 to 220° C., preferably at 60 to 180° C., particularly preferably at 100 to 160° C. The production of prepolymers containing isocyanate, the processing and use thereof is known in principle (see, for example, *Methoden der organischen Chemie* (Houben-Weyl), volume E 20, G. Thieme Verlag, Stuttgart, New York, 1987, pp. 1613–1617). The prepolymers may be produced discontinuously, for example in a stirred tank, or continuously, for example using the processes described in EP-A 0,571,828 or EP-A 0,571,831.

In case (A) is used as monomeric di- or polyisocyanates, (B1) is 20 to 85 equivalent-% (relative to the isocyanate groups in (A)) and (B2) is 15 to 90 equivalent-% (relative to the isocyanate groups in (A)).

The mixture leaving the first static mixer is passed through a second static mixer under conditions in which the reaction between (A) and (B) occurs. It is preferred that at least 40%, preferably at least 60%, most preferably 90% of the isocyanate groups in the reactive mixture will react. Conversion is principally dependent upon the temperature of the mixture in the second static mixer and the residence time of the reactive mixture in the second static mixer. Conversion rises with rising temperature and rising residence time. It is possible to determine conversion on leaving the second static mixer, for example, by titrimetric determination, for example by reacting the isocyanate groups with an excess quantity of di-n-butylamine and back-titrating with hydrochloric acid.

According to the invention, it is possible to use static mixers for both reaction stages as are, for example, described in *Chem.-Ing.-Techn.* 52, no. 4 on pages 285 to 291 and in *Mischen von Kunststoff und Kautschukprodukten*, VDI Verlag, Düsseldorf 1993.

Model SMX static mixers from the company Sulzer Chemtech, Winterthur, Switzerland are preferred. It is preferred for mixing purposes to use a static mixer having a shear rate of $100 \text{ s}^{-1}$ to $100\,000 \text{ s}^{-1}$, particularly preferably of $500 \text{ s}^{-1}$ to $50\,000 \text{ s}^{-1}$. It is furthermore preferred in stage 2 to use a static mixer having a shear rate lower than $100 \text{ s}^{-1}$, particularly preferably, lower than $10 \text{ s}^{-1}$. A jet mixer may be used for rapid mixing of components (A) and (B).

The TPU leaving the second static mixer may optionally be further processed, for example by conditioning the polymer in sheet or block form, comminution or pelletizing in shredders or mills, degassing and pelletizing with melting. The polymer is preferably passed through a unit for continuous degassing and strand formation. This unit may be a multi-screw injection molding machine or extruder which is preferably equipped with but few, if any, kneading discs.

The TPU produced using the process according to the invention have markedly better mechanical and thermal properties than comparable polymers produced using prior art processes. This applies in particular to their elastic properties, such as elongation and tensile strength, and thermal properties such as heat resistance. The TPU according to the invention may be used in the conventional manner for the production of cast, compression molded and injection molded articles, thermoformed articles, semi-finished products, containers, equipment components, casings, rollers, gears, machinery and vehicle components, rolls, elastic coatings, blown and flat films, sheathing, tubes, catheters, seals, profiles, bearing bushes, threads, filaments and fibers. They may in general advantageously be used in applications where melt processable materials are used.

The following examples explain the invention in greater detail. All percentages are by weight, unless otherwise indicated.

EXAMPLES

Practical Examples

Auxiliary substances used

Anti-oxidant: pentaerythritol tetrakis[3(3,5-di-tert.-butyl-4-hydroxy-phenyl)propionic acid ester], Anti-hydrolysis agent: N,N'-methanetetrayl-2,6-bis(1-methylethyl)aniline, Mould release agent: ethylenediamine bisstearylamide.

Example 1

Production of Prepolymer 1

3000.0 g (1.33 mol) of a polyester prepared from adipic acid and butanediol having an number average molecular weight of 2250 g/mol are desiccated for 4 hours at 140° C. and a pressure of 10 mbar in a 6 liter three-necked flask with a mechanical stirrer, internal thermometer and nitrogen inlet. 18.0 g of mould release agent, 3.0 g of anti-oxidant and 30.0 g of anti-hydrolysis agent are then added. The contents are cooled to 70° C., 1244.58 g (4.98 mol) of 4,4'-diphenylmethane diisocyanate are added, the temperature increased to 100° C. after 10 minutes and stirring is continued for 2 hours at 100° C. A prepolymer having a titratable isocyanate content of 6.4% is obtained.

Production of the Thermoplastic Polyurethane Elastomer

The reactor consists of two static mixers (SMX, Sulzer AG). Static mixer 1 has a diameter of 6 mm, a length of 35 mm and a shear rate of 500 s$^{-1}$. Static mixer 2 has a diameter of 34 mm, a length of 270 mm, a shear rate of 3 s$^{-1}$ and a heatable jacket, which is heated to 180° C. 5000 g/h of prepolymer 1 and 336.2 g/h of butanediol are continuously metered into the first static mixer. The mixture leaving static mixer 1 is passed into static mixer 2. The polymer melt leaving static mixer 2 is cooled and post-cured for 16 hours at 110° C. The comminuted polymer is converted into injection molded sheets and the properties of the injection molded sheets are determined.

Comparative Example 1

TPU of an identical overall composition using the extruder process 5000 g/h of prepolymer 1 and 336.2 g/h of butanediol are continuously metered into the feed hopper of a conventional extruder. The temperature profile of the various barrel sections is as follows:

| Barrel section | 1 | 2 | 3 | 4 | 5 | 6 | 7 | Die |
|---|---|---|---|---|---|---|---|---|
| Temp. in ° C. | 180 | 200 | 200 | 200 | 200 | 180 | 170 | 180 |

The polymer strand is drawn off from the die, passed through a water bath, pelletized and post-cured for 16 hours at 110° C. Injection molded sheets are produced from the pellets and the sheet properties measured.

Properties

| Polymer from example | Tear strength [MPa] | Elongation at break [%] | Softening temperature [° C.] | Glass transition temperature in [° C.] | Shore A hardness |
|---|---|---|---|---|---|
| 1 | 62 | 486 | 145 | −24 | 86 |
| Comparison | 40 | 450 | 120 | −26 | 85 |

Example 1 shows that the tensile strength of the TPU according to the invention has been markedly increased in comparison with the comparative example.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of thermoplastic polyurethane elastomer comprising
    (a) introducing and homogeneously mixing (A), (B) and optional (C) in a first static mixer at a shear rate of 500 to 50,000 s$^{-1}$ and at a temperature of 50 to 250° C., to form a substantially unreacted mixture wherein no more than 10 wt. % of said (A) has reacted and
    (b) reacting said substantially unreacted mixture in a second static mixer operating at a shear rate of 1 to 100 s$^{-1}$ and a temperature of 50 to 250° C., to form a thermoplastic polyurethane elastomer, and
    (c) continuously degassing and extruding said thermoplastic polyurethane elastomer,
wherein (A) denotes one or more isocyanates, and where (B) denotes a mixture of (B1) and (B2) where B1 is 0 to 85 equivalent-% (relative to the isocyanate groups in (A)) of one or more compounds having an average of 1.8 to 3.0 Zerewitinoff active hydrogen atoms and a number average molecular weight of 450 to 10000, and where B2 is 15 to 100 equivalent-% (relative to the isocyanate groups in (A)) of one or more chain extenders having an average of 1.8 to 3.0 Zerewitinoff active hydrogen atoms and a molecular weight of 62 to 400, and where (C) is an amount up to 20 % (relative to the weight of said thermoplastic polyurethane elastomer) of auxiliary additives.

2. The process of claim 1 wherein (A) is a prepolymer containing isocyanate groups.

3. The thermoplastic polyurethane elastomers produced according to the process of claim 1.

* * * * *